Jan. 16, 1934.  E. L. SMITH ET AL  1,943,559
MACHINE FOR MAKING PACKAGES WITH INTEGRAL TEARING STRIPS
Filed Feb. 13, 1933  4 Sheets-Sheet 1
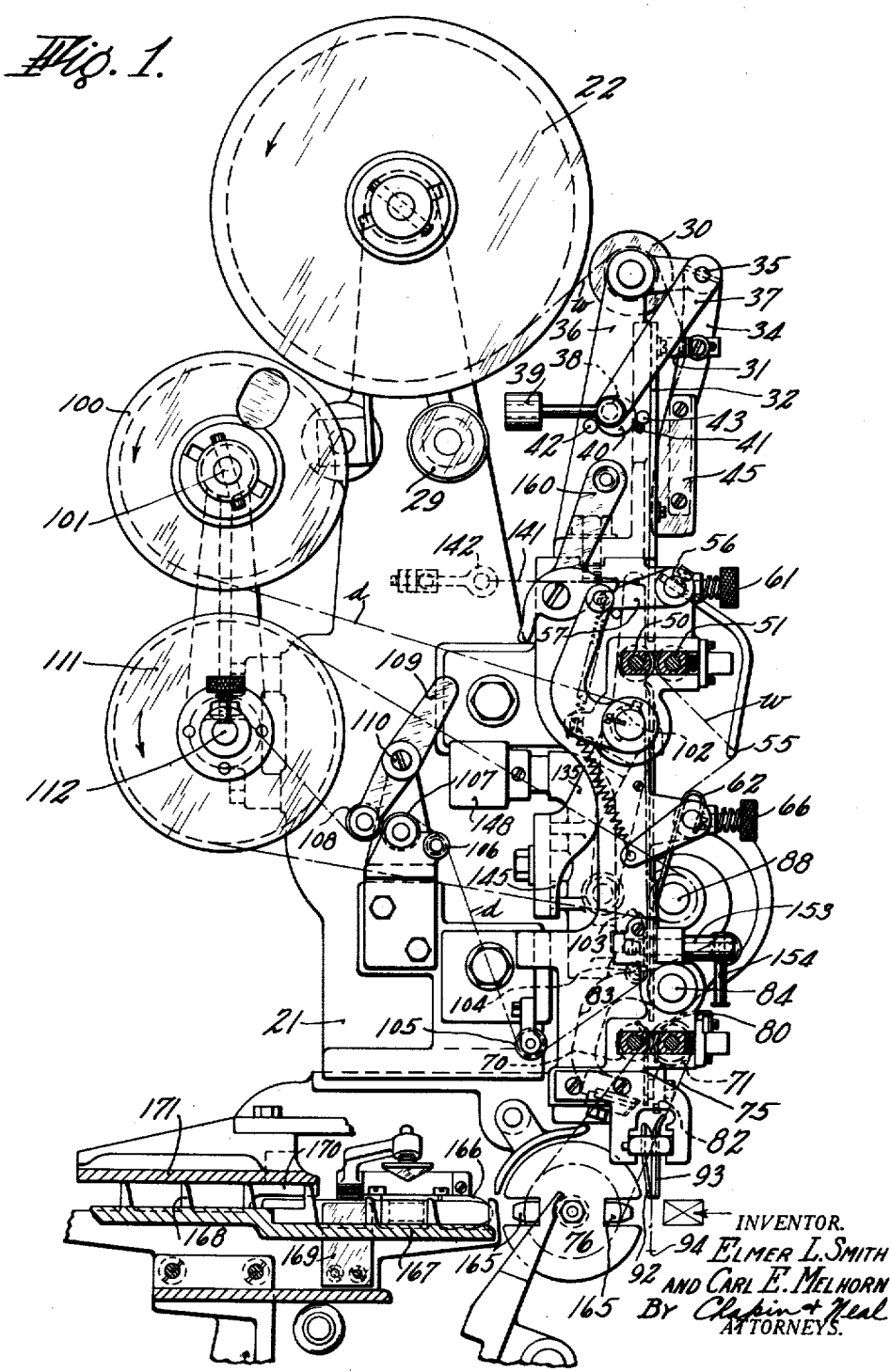

Jan. 16, 1934.   E. L. SMITH ET AL   1,943,559
MACHINE FOR MAKING PACKAGES WITH INTEGRAL TEARING STRIPS
Filed Feb. 13, 1933   4 Sheets-Sheet 2
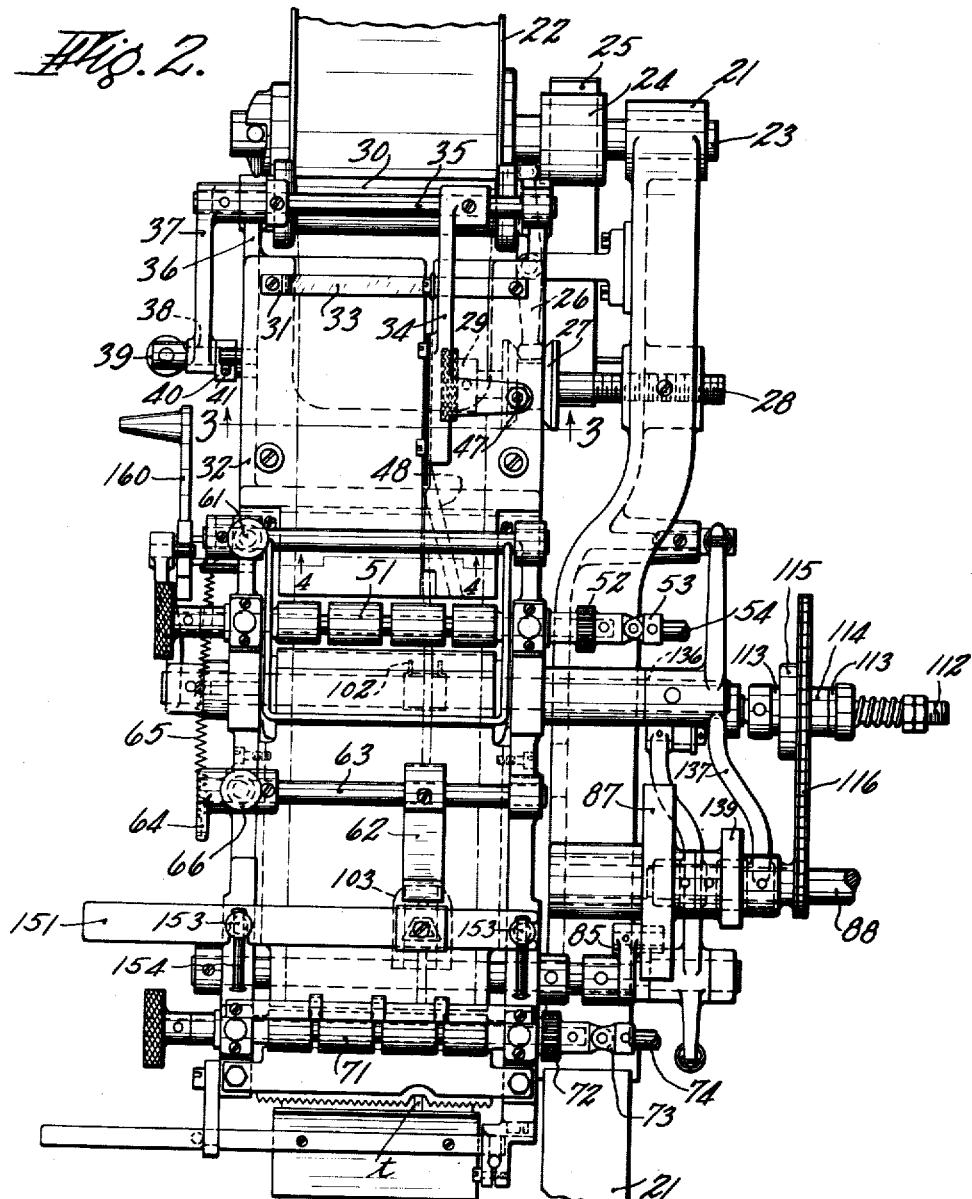
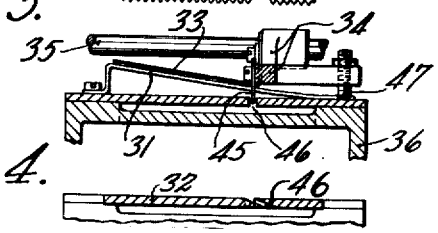
INVENTOR.
ELMER L. SMITH
AND CARL E. MELHORN
BY Chapin + Neal
ATTORNEYS.

Jan. 16, 1934.  E. L. SMITH ET AL  1,943,559
MACHINE FOR MAKING PACKAGES WITH INTEGRAL TEARING STRIPS
Filed Feb. 13, 1933    4 Sheets-Sheet 3
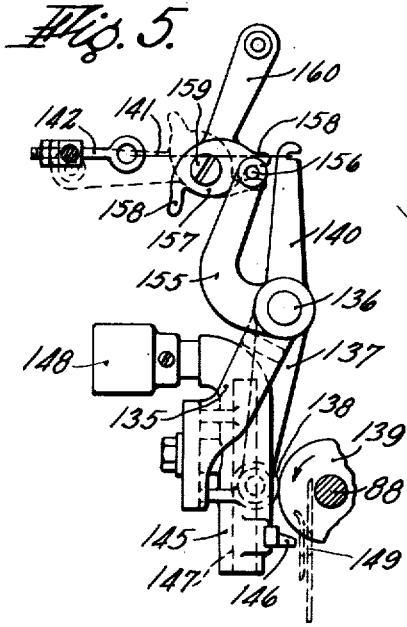
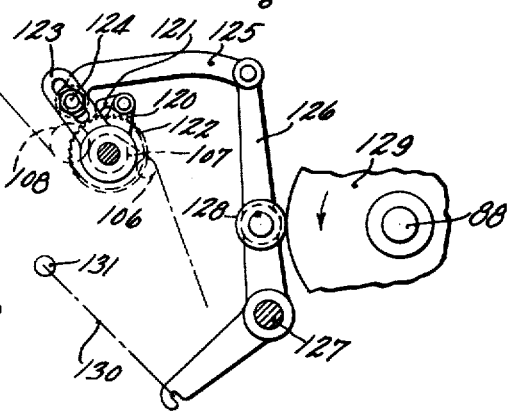
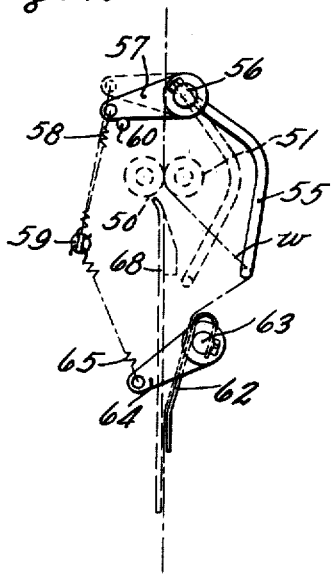
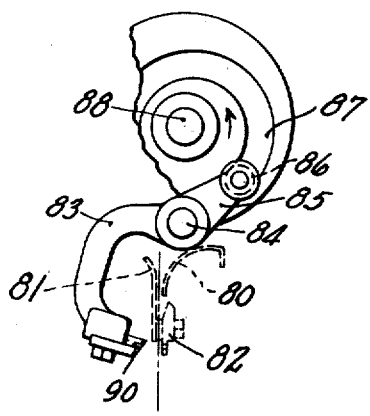
INVENTOR.
ELMER L. SMITH
BY AND CARL E. MELHORN
Chapin + Neal
ATTORNEYS.

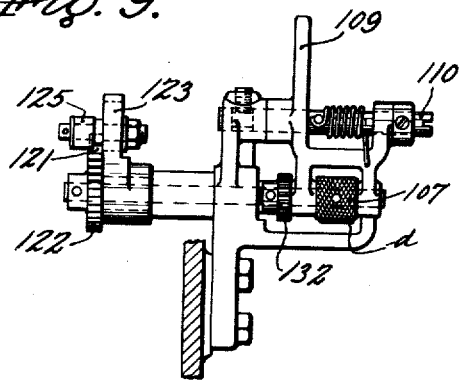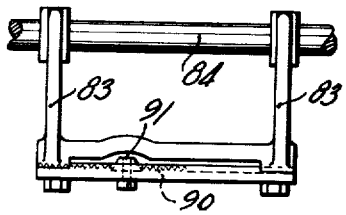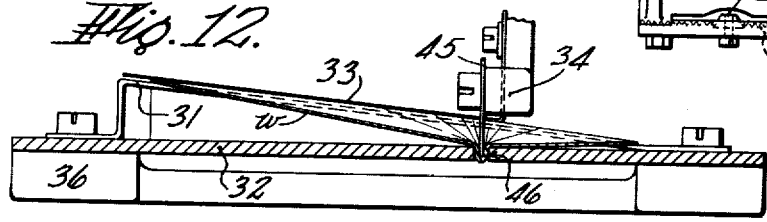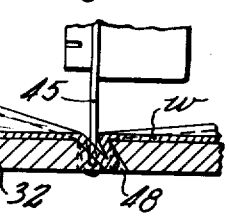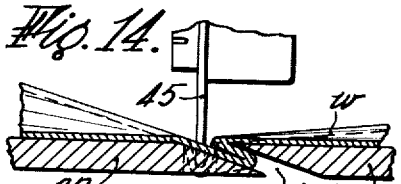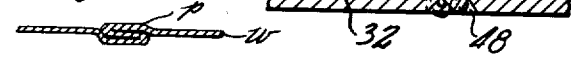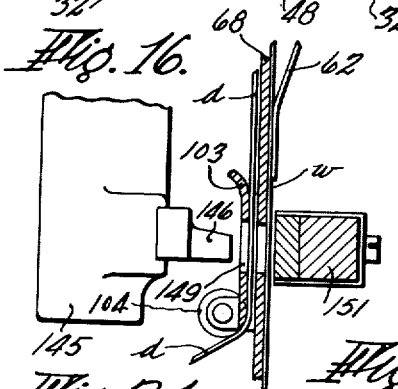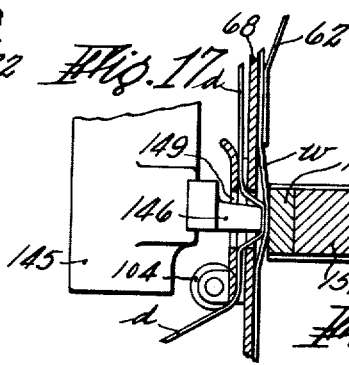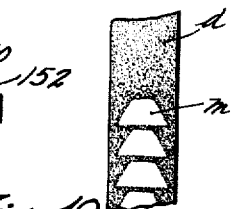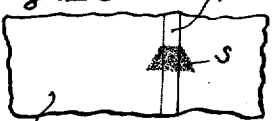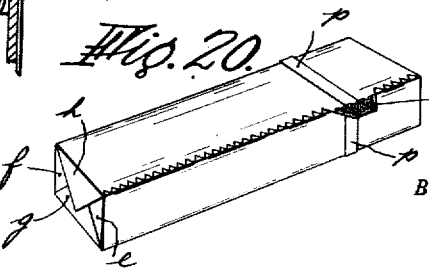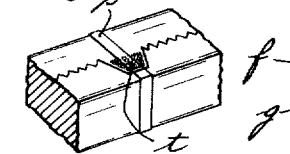

Patented Jan. 16, 1934

1,943,559

UNITED STATES PATENT OFFICE 1,943,559

MACHINE FOR MAKING PACKAGES WITH INTEGRAL TEARING STRIPS

Elmer L. Smith, Longmeadow, and Carl E. Melhorn, Springfield, Mass., assignors to Package Machinery Company, Springfield, Mass., a corporation of Massachusetts Application February 13, 1933. Serial No. 656,606

11 Claims. (Cl. 93—2)

This invention relates to wrapping machines and has particular reference to a mechanism for forming a package in which the wrapping material is given a preliminary pleating treatment so as to form an integral tearing strip.

One object of the invention is to provide a simple and effective mechanism for forming a flat tearing pleat in a web of wrapping material and then folding the wrapper about an article with the pleat arranged in proper relation to the ends of the article. A further object is to provide a mechanism in which the wrapper is formed with an integral tearing strip and is severed so as to produce a tearing tab by which the strip may be easily grasped. A further object is to provide mechanism in which a spot of color will be printed on the wrapping material in position to attract attention to the tearing tab on the exposed end of the tearing strip when the article is completely wrapped. A further object is to provide mechanism which will print this spot of color on the web in such position that it will not be disturbed by the wrapping operations or by any subsequent heat sealing treatment.

Additional objects will appear from the following description and claims.

Referring to the drawings:

Fig. 1 is a side elevation of a fragment of a wrapping machine constructed in accordance with our invention and embodying mechanism for supplying and pleating a web, means for printing a colored spot upon it, and means for severing the web to form a wrapper which is presented in correct registration with the wrapping mechanism;

Fig. 2 is an elevation of the mechanism shown in Fig. 1;

Fig. 3 is a section on line 3—3 of Fig. 2;

Fig. 4 is a section on line 4—4 of Fig. 2;

Fig. 5 is a detail of the spot printing mechanism;

Fig. 6 is a detail of a feeding mechanism for the decalcomania tape used in the printing operation;

Fig. 7 is a detail showing certain of the web guiding devices;

Fig. 8 is a detail of the web severing mechanism;

Fig. 9 is a side view of certain of the parts shown in Fig. 6;

Fig. 10 is a detail of one of the knife blades;

Fig. 11 is a detail taken from the left in Fig. 8;

Figs. 12, 13, 14 and 15 are details illustrating successive stages in the formation of a pleat;

Figs. 16 and 17 are views illustrative of the action of the printing mechanism;

Fig. 18 is a fragmentary view of the decalcomania tape;

Fig. 19 is a detail of the pleated and printed wrapper web;

Fig. 20 is a view of a completed package; and

Fig. 21 is a fragmentary view of a completed package showing a modified construction.

The mechanism is shown as being mounted upon a frame 21 which is preferably rigidly attached to the frame of a wrapping machine. Journalled in this frame is a reel 22 for a web of wrapping material $w$, preferably of some transparent substance such as one of the now common cellulose derivatives. The reel is mounted upon a shaft 23 having, as shown in Fig. 2, a hub 24 against which rests a tension spring brake 25. Engageable between the hub and the reel is one end of a lever 26 pivoted on the frame, the other end of the lever engaging between the flanges of a collar 27 mounted on a threaded shaft 28. This shaft is provided with a handle 29 by which it may be adjusted in the frame to center the reel. From the reel web $w$ passes over a flanged roll 30 and then over a slanting strip 31 secured to a guide plate 32, as best shown in Figs. 3 and 12. Referring to the latter figure, it will be seen that the slanting strip 31 gives the web a constant tendency to shift toward the right as viewed in that figure; a feature which is of use in preserving proper registration during the pleating operation.

An overlying spring guide 33 rests upon the web so as to hold it against the strip 31. This guide is carried by an arm 34 fixed upon a shaft 35 (Fig. 2) which is itself journalled upon the bracket 36 which carries the guide plate 32. Also secured to the shaft 35 is an arm 37, pivoted to the end of which is a rod 38. A weighted handle 39 (Fig. 1) is fastened to the end of the rod, and on its inner end the rod carries an eccentric member 40 having a projecting pin 41. This pin runs between stops 42 and 43 as the handle is shifted, the eccentric member 40 serving to give the arm 37, and consequently arm 34, a slight motion sufficient to carry the latter arm out of operative position and permit the threading of a web in starting up the machine.

Secured to the arm 34 is a folding blade 45 adapted to enter a slot 46 in the guide plate 32, as shown in Fig. 12. As the web is drawn past the blade an outstanding fold is formed in it, as clearly shown in that figure. A stop 47 (Fig. 2) limits the amount to which the blade can enter the slot. Below the folding blade the slot takes on a slanting form so that, as shown progressively in Figs. 12, 13, 14 and 15, the outstanding fold is turned over to form a pleat $p$.

The web $w$ is drawn off from the reel and past the pleating mechanism by a pair of continuously rotating rolls 50 and 51 (Fig. 1) geared together as at 52 (Fig. 2). These rolls are preferably driven from a suitable continuously rotating shaft of the wrapping machine, a universal joint 53 and a shaft 54 being shown for this purpose. Below the rolls 50 and 51 the web passes around a spring held bail 55 (Figs. 1 and 7) fixed to a shaft 56. An arm 57 on this shaft is joined by a spring 58 with a stationary pin 59, the motion being limited by a stop 60. While the web is initially fed out continuously, its subsequent motion is intermittent as will be described below, and the bail serves as a take-up member to take up the slack produced by the continuous feed rolls during the time when the forward end of the web is being held stationary. A set screw 61 may serve to hold the bail temporarily in fixed position to assist in the threading of the paper.

Below the bail is a tension plate 62 (Figs. 1, 2 and 7) secured to a shaft 63. An arm 64 on this shaft is connected by a spring 65 with the pin 59 so as to give the tension plate a continuous tension in a clockwise direction as viewed in Fig. 7. The screw 66 operates on the shaft 63 when desired to hold the tension plate when moved manually into an inactive position. The tension plate serves to press the web against a supporting plate 68 (see also Fig. 16) and, besides exerting a controlling tension upon the web, assists the feed rolls 50 and 51 in ironing down the previously formed pleat.

The intermittent feed referred to above is secured by feed rolls 70 and 71 (Fig. 1) geared together as at 72 (Fig. 2) and coupled by a universal joint 73 to an intermittent drive shaft 74. Any suitable intermittent drive may be used, a chain and sprocket connection 75 (Fig. 1) being indicated as connecting the shaft of one of the feed rolls to the shaft of a tumble box 76. The tumble box, as well recognized in the art, rotates intermittently and through the chain and sprocket connection will impart this intermittent motion to the feed rolls.

The intermittent rolls deliver the web between a pair of guides 80 and 81 (Fig. 8), the former of which bears a stationary knife block 82. The arm 83 is secured to a shaft 84 which in turn bears an arm 85. On this latter arm is the cam roll 86 running in the groove of a cam 87 secured to a shaft 88 which may be driven in a continuous manner through a connection with the wrapping mechanism. The lower end of the arm 83 carries a movable cutter blade 90, best shown in Figs. 10 and 11. This cutter blade is preferably formed with a serrated edge and has a projecting portion 91 so that it will not cut in a straight line across the entire width of the web. The stationary knife blade is correspondingly shaped. The effect of the cutters is to sever the web along a transverse line, broken at one point to provide a tab $t$, as best shown in Figs. 2 and 20. The wrapper sheet cut off by the cutters drops between guides 92 and 93 (Fig. 1) onto a stop 94, whereby the wrapper is registered with the tumble box in correct position for association with the article. Further reference will be made to the exact manner of registration in considering below the operation of the mechanism.

As is well known, difficulty is experienced in printing by the usual methods upon the cellulose derivative wrapping materials now in use. It is desirable to imprint upon the web a spot of color, either directly on the tab as is preferable, or in such relation to it as to direct attention to the tab in the finished product. To produce this printing even where the cellulose derivative material is used, we provide a printing mechanism operating upon the decalcomania process. The decalcomania tape $d$ is mounted upon a reel 100 journaled upon a shaft 101. The tape passes over a guide 102 (Figs. 1 and 2), preferably so positioned as to bring the tape into alignment with the pleat, and the tape then passes between the supporting plate 68 and a guide 103 (Fig. 16). The tape then passes around rolls 104, 105 and 106 and between feed rolls 107 and 108 (Fig. 1). The latter roll is preferably carried by a spring pressed arm 109 pivoted to the frame at 110. From the feed rolls 107, 108, the tape passes to a rewind reel 111 mounted upon a shaft 112. This shaft is driven by friction washers 113 (Fig. 2), spring pressed against a hub 114 of a sprocket 115 driven by a chain 116 from the continuously rotating cam shaft 88. The rotation of this rewind reel is not intended to control the motion of the tape but simply keeps the amount delivered by the feed rolls wound up.

The feed rolls are themselves operated by a ratchet and pawl mechanism best shown in Figs. 6 and 9. Mounted for oscillation on the shaft of the roll 107 is a pawl carrier 120 bearing a pawl 121. As the pawl carrier is oscillated, the pawl acts upon a ratchet 122 on the shaft to cause intermittent movement of the feed rolls. Attached to the pawl carrier is a slotted arm 123 in which a pivot 124 is adjustably mounted. This pivot is connected by a link 125 to the upper end of a bell crank lever 126, secured to the frame and having a cam roll 128 coacting with a cam 129 on the cam shaft 88. A spring 130 joins the lower end of the bell crank with a pin 131 to keep the cam roll against the cam. The two feed rolls are geared together as shown at 132 (Fig. 9) so that they rotate simultaneously in opposite directions.

The printing attachment is carried by an arm 135 (Figs. 1 and 5) fixed to a shaft 136 pivoted in the frame. A second arm 137 fixed to this shaft bears a cam roll 138 running on a cam 139 on the cam shaft 88. The arm 140 extends upward from the shaft 136 and is connected by a spring 141 with an adjustable eye 142 so that the cam roll will be held against the cam. It will be noted that the actual printing pressure is given by the spring rather than by the cam so as to avoid breakage in case the machine becomes jammed and so that a more uniform printing pressure will be obtained. Mounted on the lower end of the arm 135 is a bracket 145 bearing a printing die 146 and having imbedded in it an electrical heater 147 of any usual type. A junction box 148 is shown to provide an outlet for the wiring leading from this heater. The printing die moves from an inactive position (shown in Fig. 16) through apertures 149 in the plates 68 and 103 so as to press (Fig. 17) the decalcomania tape $d$ and the pleated web against a pad 150 of rubber or similar resilient material mounted upon a bar 151 and held in place by clips 152. On account of the head of the die, the pad may require frequent renewal and the bar 151 is therefore held to the frame by screws 153 having handles 154.

It is desirable when the machine is stopped to hold the heated printing die away from the tape.

For this reason an arm 155 (Fig. 5) is secured to the shaft 136 and carries a pin 156 at its upper end. This pin is engaged by an eccentric member 157 having arms 158 and carried upon a shaft 159. This shaft has a handle 160 which can be swung, as indicated in Fig. 5, from the position shown in full lines in which it prevents the cam roll from following the cam, to the dotted line position in which the printing mechanism is left free for operation.

The manner in which the mechanism described operates will now be considered. As mentioned above, the continuous feed rolls draw the web constantly through the pleating mechanism, forming and ironing down a pleat $p$ as shown in Fig. 15. The pleated web then passes through the printing mechanism where the heated die 146 presses the decalcomania tape against the web to produce a spot $s$ (Fig. 19). The color thus transferred from the tape leaves a vacant spot $m$ in the latter as indicated in Fig. 18. This printing operation preferably takes place on a surface of the web which will not be exposed when the package is completed. Due to the transparency of the wrapping material, the spot can be placed on the inside of the outer layer or upon the outside or inside of an inner layer of the wrapper, considering it as in place upon the article. The pleated and printed web is then acted upon by the cutter to sever it along a transverse line, preferably leaving a tab $t$ to assist in grasping the end of the tearing pleat in the completed package. If it is desired to have the printing upon the inside of the tab, the line of cut is chosen so as to pass around the printing in the manner shown in Figs. 2 and 20. The cutter deposits the wrapper upon the stop 94 and the wrapper, together with an article, is carried into the tumble box by any of the mechanisms usual in this type of machine.

In the package form first to be considered, the tab projects from one edge of the package in the manner shown in Fig. 20. To accomplish this, the stop 94 is set so that after the circumferential folding of the wrapper around the article by the tumble box, the outer tab bearing edge of the wrapper will lie along one edge of the package. It is equally possible, although not always so convenient, to have the tab lie within the boundary of one face of the article as shown in Fig. 21. The stop 94 can be readily shifted to produce this adjustment.

On entering the tumble box the package encounters end tuckers 165 which form end folds $e$ in the usual manner. On leaving the tumble box, folders 166 produce opposite folds $f$. The lower folds $g$ are made by folding plates 169 carried by a transporter mechanism 168, and the upper folds $h$ are made by stationary folding plates 170. A similar mechanism is fully described in the prior patent to Smith, 1,853,091, dated April 12, 1932, and need not be further considered here. The overlapping longitudinal edges of the package are sealed together by the usual heat sealers 171. The location of the spot upon the wrapper avoids the possibility of rubbing off the printing material as the package passes underneath the heat sealer.

What we claim is:

1. A wrapping machine comprising means for forming a wrapper with a flattened pleat extending along it, and means for folding the pleated wrapper around an article with one end of the pleat exposed to form a tearing strip.

2. A wrapping machine comprising means for forming a wrapper with a flattened pleat extending along it, means for imprinting a spot upon or adjacent to the pleated portion, and means for folding the pleated wrapper around an article with one end of the pleat exposed to form a tearing strip and with the spot positioned to direct attention to said exposed end.

3. A wrapping machine comprising means for forming a wrapper of transparent material with a flattened pleat extending along it, means for imprinting a spot on or adjacent to the pleated portion, and means for folding the pleated wrapper around an article with one end of the pleat exposed to form a tearing strip and with the spot within the wrapper and visible through the transparent material thereof in position to direct attention to the exposed end of the pleat.

4. A wrapping machine comprising means for forming a longitudinal pleat in a web of wrapping material, means for severing the web with a projecting tab including the pleat, and means for wrapping the severed sheet around an article with the tab exposed.

5. A wrapping machine comprising means for forming a longitudinal pleat in a web of wrapping material, means for printing a spot of color upon the pleated portion of the web, means for severing the web upon an irregular line so that the colored portion of the pleat forms a projecting tab, and means for wrapping the severed sheet around an article with the tab projecting from one edge thereof.

6. A wrapping machine comprising means for forming a longitudinal pleat in a web of wrapping material at a distance from one edge thereof in excess of the margin requirement for forming the end folds, means for printing a spot of color upon the pleated portion of the web, means for severing the web upon an irregular line so that the colored portion of the pleat forms a projecting tab, means for registering the severed sheet with an article to be wrapped so that when the sheet is folded around the article the edge of the sheet bearing the projecting tab will be substantially in registration with one edge of the article and the pleat will extend circumferentially around the article in spaced relation to one end thereof, means for folding the sheet circumferentially around an article, and means for folding the marginal portions of the sheet against the ends of the article.

7. A wrapping machine comprising means for forming a longitudinal pleat in a web of wrapping material at a distance from one edge thereof in excess of the requirements for forming the end folds, means for severing a sheet from the pleated web, means for wrapping the pleated and severed sheet around an article with the pleat extending circumferentially around the article intermediate its ends, and means for holding the wrapper at the ends of the article, the circumferentially extending pleat serving as a tearing strip to assist in the opening of the finished package.

8. A wrapping machine comprising means for forming a longitudinal pleat in a web of wrapping material at a distance from one edge thereof in excess of the requirements for forming the end folds, means for severing a sheet from the pleated web, means for overlapping the pleated and severed sheet around an article with the pleat extending circumferentially around the article intermediate its ends, means for sealing together the overlapped portions of the wrapper, and means for folding the wrapper at the ends of the article, the circumferentially extending pleat serving as a tearing strip to assist in the opening of the finished package.

9. A wrapping machine comprising means for feeding a web of wrapping material, a slotted plate, a folding blade extending into the slot to form an outstanding longitudinal fold in the web, the plate having its slot beyond the blade formed on an angle so as to flatten the outstanding fold into a pleat extending longitudinally of the web, a cutting blade extending transversely of the web and having a contour shaped to produce a small projecting tab including the pleated portion of the web, means for operating the cutter periodically to sever tabbed sheets successively from the web, and means for folding the severed sheets around articles with the pleat extending circumferentially thereof and for overlapping the severed ends of the sheet with the tab on the outside of said overlap.

10. A wrapping machine comprising means for feeding a web of wrapping material, a slotted plate, a guide slanting from outside the plane of plate towards the slot and over which the web passes in reaching the plate, a folding blade entering into the slot to form an outstanding longitudinal fold in the web, the plate having its slot beyond the blade formed on an angle so as to flatten the outstanding fold into a pleat extending longitudinally of the web, a cutting blade extending transversely of the web and having a contour shaped to produce a small projecting tab including the pleated portion of the web, means for operating the cutter periodically to sever tabbed sheets successively from the web, and means for folding the severed sheets around articles with the pleat extending circumferentially thereof and for overlapping the severed ends of the sheet with the tab on the outside of said overlap.

11. A wrapping machine comprising means for feeding a web of wrapping material, means for forming a longitudinal pleat in the web, means for progressively advancing a decalcomania tape adjacent the web and in line with the pleated portion thereof, an abutment adjacent the web, a heated die, means for periodically pressing the die against the abutment to cause transfer of pigment from the tape to the pleated portion of the web, a cutter operable to sever a sheet from the web with a projecting tab including the pigmented portion of the pleat, and means for folding the severed sheet around an article with the pleat extending circumferentially thereof and for overlapping the tabbed end of the severed sheet over the other end of the sheet.

ELMER L. SMITH.
CARL E. MELHORN.

CERTIFICATE OF CORRECTION.

Patent No. 1,943,559.                                   January 16, 1934.

ELMER L. SMITH, ET AL.

It is hereby certified that error appears in the printed specification of the above numbered patent requiring correction as follows: Page 1, line 37, before "elevation" insert the word end; and line 80, before "web" insert the word the; page 3, line 133, claim 7, for "holding" read folding; and that the said Letters Patent should be read with these corrections therein that the same may conform to the record of the case in the Patent Office.

Signed and sealed this 27th day of February, A. D. 1934.

F. M. Hopkins

Acting Commissioner of Patents.

(Seal)

9. A wrapping machine comprising means for feeding a web of wrapping material, a slotted plate, a folding blade extending into the slot to form an outstanding longitudinal fold in the web, the plate having its slot beyond the blade formed on an angle so as to flatten the outstanding fold into a pleat extending longitudinally of the web, a cutting blade extending transversely of the web and having a contour shaped to produce a small projecting tab including the pleated portion of the web, means for operating the cutter periodically to sever tabbed sheets successively from the web, and means for folding the severed sheets around articles with the pleat extending circumferentially thereof and for overlapping the severed ends of the sheet with the tab on the outside of said overlap.

10. A wrapping machine comprising means for feeding a web of wrapping material, a slotted plate, a guide slanting from outside the plane of plate towards the slot and over which the web passes in reaching the plate, a folding blade entering into the slot to form an outstanding longitudinal fold in the web, the plate having its slot beyond the blade formed on an angle so as to flatten the outstanding fold into a pleat extending longitudinally of the web, a cutting blade extending transversely of the web and having a contour shaped to produce a small projecting tab including the pleated portion of the web, means for operating the cutter periodically to sever tabbed sheets successively from the web, and means for folding the severed sheets around articles with the pleat extending circumferentially thereof and for overlapping the severed ends of the sheet with the tab on the outside of said overlap.

11. A wrapping machine comprising means for feeding a web of wrapping material, means for forming a longitudinal pleat in the web, means for progressively advancing a decalcomania tape adjacent the web and in line with the pleated portion thereof, an abutment adjacent the web, a heated die, means for periodically pressing the die against the abutment to cause transfer of pigment from the tape to the pleated portion of the web, a cutter operable to sever a sheet from the web with a projecting tab including the pigmented portion of the pleat, and means for folding the severed sheet around an article with the pleat extending circumferentially thereof and for overlapping the tabbed end of the severed sheet over the other end of the sheet.

ELMER L. SMITH.
CARL E. MELHORN.

CERTIFICATE OF CORRECTION.

Patent No. 1,943,559.                                       January 16, 1934.

ELMER L. SMITH, ET AL.

It is hereby certified that error appears in the printed specification of the above numbered patent requiring correction as follows: Page 1, line 37, before "elevation" insert the word end; and line 80, before "web" insert the word the; page 3, line 133, claim 7, for "holding" read folding; and that the said Letters Patent should be read with these corrections therein that the same may conform to the record of the case in the Patent Office.

Signed and sealed this 27th day of February, A. D. 1934.

F. M. Hopkins

Acting Commissioner of Patents.

(Seal)